United States Patent [19]
Feterl

[11] 3,972,541
[45] Aug. 3, 1976

[54] LOAD COUPLER FOR TRAILERS

[75] Inventor: Leon G. Feterl, Salem, S. Dak.

[73] Assignee: SOS Consolidated, Inc., Birmingham, Mich.

[22] Filed: May 14, 1975

[21] Appl. No.: 577,559

[52] U.S. Cl............................... 280/423 R; 280/504
[51] Int. Cl.².......................................... B60D 1/00
[58] Field of Search................ 280/423 R, 504, 514, 280/515

[56] References Cited
UNITED STATES PATENTS

| | | | |
|---|---|---|---|
| 3,703,301 | 2/1971 | Randle | 280/504 |
| 3,730,557 | 5/1973 | Cox | 280/504 |
| 3,837,675 | 9/1974 | Barnes et al. | 280/423 R |
| 3,889,978 | 6/1975 | Kann | 280/423 R |

Primary Examiner—Robert R. Song
Attorney, Agent, or Firm—Williamson, Bains & Moore

[57] ABSTRACT

A drawbar on a trailer is provided with a pair of vertically extending coupling arms which are notched at their bottom ends to fit around a round coupling bar mounted for revolving movement in a horizontal plane on a base plate affixed to the rear end of a towing vehicle. The coupling bar is affixed across a mounting ring rotatably supported within a circular opening of a base plate by circular bars bearing against the base plate.

17 Claims, 4 Drawing Figures

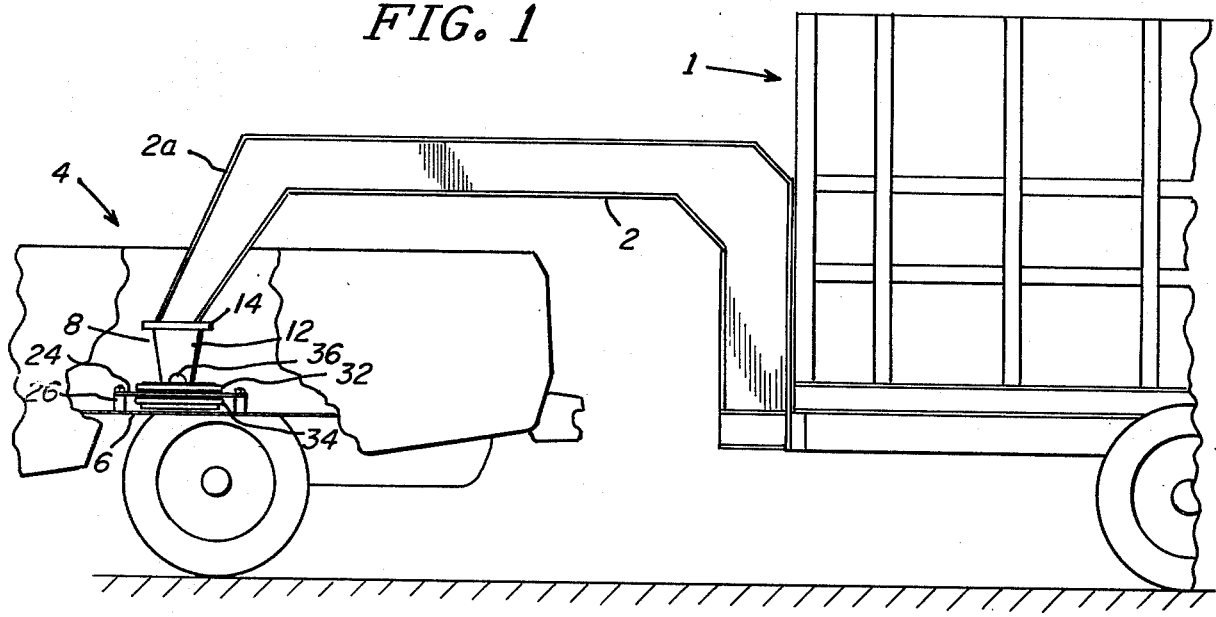
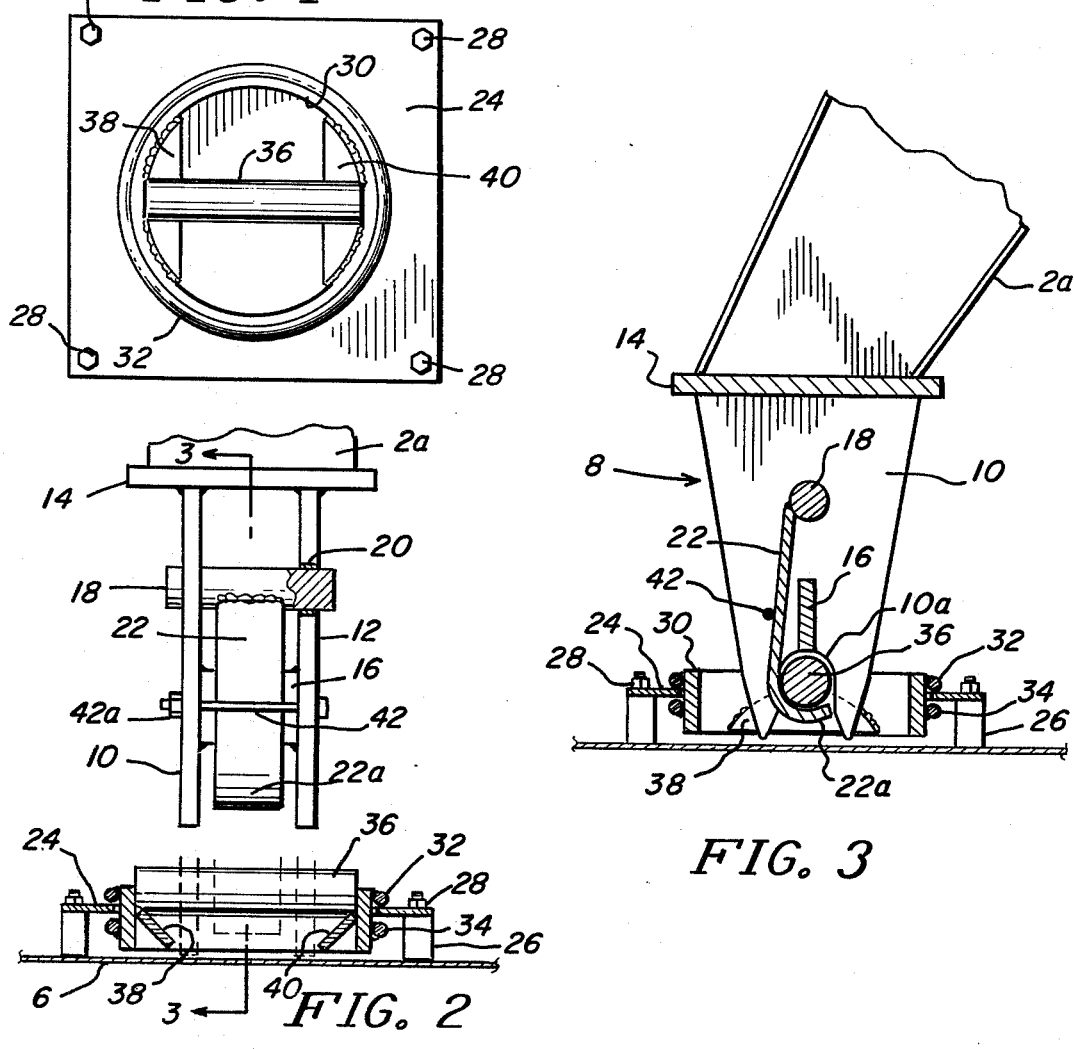

LOAD COUPLER FOR TRAILERS

BRIEF SUMMARY OF THE INVENTION

The trailer hitch of this invention is particularly characterized by a load coupler assembly comprised of coupling elements which are quickly and easily engagable in such a way as to evenly distribute the load of a trailer on the rear end of a towing vehicle while permitting full, relative rotating movement between the towing vehicle and the trailer for turning.

These basic objectives are achieved by utilizing vertically extending coupling arms on a trailer towing member to readily couple to a horizontal round coupling bar supported on a base plate on the rear end of a towing vehicle for rotating movement about a vertical axis on a horizontal plane. Downwardly opening notches on the bottom ends of the coupling arms permit these arms to be easily positioned over and around the aforesaid coupling bar in releasable, coupling engagement therewith.

As a particularly beneficial feature of my loading coupling, the load of the towing vehicle is distributed over the rear frame bed of the towing vehicle through a rotatable mounting ring to which the aforesaid coupling bar is affixed at its opposite ends. The mounting ring is rotatably supported within a circular aperture of a base plate by annular bearing supports which are affixed to the outer periphery of the mounting ring and bear against the base plate.

The releasable, locking engagement of the trailer coupling arms with the towing vehicle coupling bar is simply and effectively provided for by spacing the vertically extending coupling arms apart and rotatably supporting a latch arm between them. The latch arm is hooked at its bottom end and is swingable under the coupling bar on the towing vehicle to securely engage the coupling arms therewith.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 1 is a side elevation view of a towing vehicle and trailer hitched together by means of the load coupler of this invention;

FIG. 2 is a front, elevation view, partially in section, of the load coupler of FIG. 1;

FIG. 3 is a vertical section view of the load coupler taken along lines 3—3 of FIG. 2; and FIG. 4 is a top, plan view of the tow vehicle mounted base plate unit of the coupling assembly.

DESCRIPTION OF THE PREFERRED EMBODIMENT

Although the load coupler of this invention may well find application with various types of trailers and towing vehicles, it has been particularly designed with a view towards use in combination with trailers having drawbars of the gooseneck type. A farm trailer 1 having such a gooseneck drawbar 2 is illustrated in FIG. 1. Pickup trucks are now widely used for towing such trailers having gooseneck shaped drawbars. This is accomplished by utilizing a coupling device of some kind on the cargo carrying bed of the pickup truck. Coupling units heretofore used for this purpose have suffered from the disadvantages of being bulky, costly, and difficult to install and utilize. The load coupler disclosed herein has been designed and developed with a view towards overcoming such problems.

As may be noted by reference to FIG. 1, the load coupler of this invention is shown in combination with a pickup truck 4, which serves as the towing vehicle. The towing vehicle mounted base unit of the coupling assembly, which is described below in detail, is affixed to the rear, cargo carrying bed 6 of pickup truck 4. The trailer mounted part of the coupling assembly is generally indicated by reference numeral 8, and is mounted on the lower end of a forwardly and downwardly extending segment 2a of the gooseneck shaped drawbar 2. As may best be understood by reference to FIGS. 2 and 3, the trailer mounted part 8 of the coupling assembly is comprised of a pair of vertically extending coupling arms 10 and 12 affixed at their upper ends to a mounting plate 14. Plate 14 is secured to the bottom of drawbar forward segment 2a. Coupling arms 10 and 12 are reinforced and strengthened by a cross plate 16 welded therebetween. At their upper ends, coupling arms 10 and 12 are apertured to receive a latch support bar 18. A pair of sleeve bearings, one of which is shown at 20 in FIG. 2, rotatably support bar 18 for rotation about its horizontal axis. An elongated latch arm 22 is affixed to bar 18 by welding, or other suitable means. Thus, latch arm 22 is rotatable with bar 18 to carry out its coupling latching function utilizing its lower, hooked end 22a in a manner hereinafter explained.

The lower coupling unit affixed to the bed of the towing vehicle 4 includes a horizontally extending base plate 24. Four studs 26 welded or otherwise secured to truck bed 6 support base plate 24 at an elevated level above the truck bed as shown in FIGS. 2 and 3. Studs 26 have threaded upper ends of reduced diameter which extend through apertures provided in base plate 24, nuts 28 serving to secure base plate 24 to the upper, threaded ends of studs 26. Base plate 24 has a circular aperture cut therein within which a ring member 30 is received and rotatably supported. Ring member 30 is preferably a segment of a pipe, and is oriented in the upright position shown in FIGS. 2 and 3 with its side walls extending vertically. Annular bearing support means on the outside face of ring member 30 serve to rotatably support it on the inner circular periphery of base plate 24 around the circular aperture formed therein. This bearing means preferably takes the form of a pair of vertically spaced circular bars 32 and 34 which are secured to the outside face of ring member 30, as by welding. The inner circular periphery of base plate 24 extends between circular bearing bars 32 and 34 as shown in FIGS. 2 and 3, whereby these bearing bars serve to rotatably support and restrain ring member 30 on base plate 24. Upper circular bearing bar 32 engages the top face of base plate 24 around its inner periphery adjacent to the circular aperture therein within which ring member 30 is positioned.

Extending across ring member 30, and affixed thereto at its opposite ends is a round coupling bar 36. As is indicated in FIG. 4, coupling bar 36 preferably extends diametrically across ring member 30 in a horizontal plane. A pair of centering, guide plates 38 and 40 are affixed to the inside face of ring member 30 below coupling bar 36, preferably by welding. As may be noted by reference to FIG. 3, guide plates 38 and 40 have arcuate recesses formed in the upper edge thereof so that they will extend under coupling bar 36. Guide plates 38 and 40 incline inwardly and downwardly from opposite inside faces of ring member 30 and are spaced apart at their inner ends by a distance substantially coinciding with the distance between the outside faces of coupling arms 10 and 12.

Coupling arms 10 and 12 have downwardly opening notches formed on their bottom ends to permit their coupling engagement with coupling bar 36. One of these notches is shown at 10a on arm 10 in FIG. 3. It is to be noted that the notches are provided with an arcuate shape at their upper ends to conform to the arcuate shape of round coupling bar 36. The notches in the bottom ends of coupling arms 10 and 12 are of sufficient length to permit the bottom ends of arms 10 and 12 to extend over and around coupling bar 36 to points below the coupling bar as shown in FIG. 3. The downwardly opening notches at the bottom ends of coupling arms 10 and 12 permit these arms to be quickly and easily dropped into position over coupling bar 36 in releasable, coupling engagement therewith.

In operation, the forward end of gooseneck drawbar 2 is coupled to the base plate unit affixed to the bed 6 of towing vehicle 4 by first aligning coupling arms 10 and 12 directly over coupling bar 36. As arms 10 and 12 are lowered on to bar 36, this coupling bar is restrainably received within the closely conforming notches formed on the bottom ends of arms 10 and 12. Any slight lateral misalignment of coupling arms 10 and 12 with the center of coupling bar 36 is corrected by guide plates 38 and 40. These downwardly and inwardly inclined guide plates serve to guide the bottom ends of coupling arms 10 and 12 inwardly to the space between them, within which the coupling arms 10 and 12 are laterally restrained on coupling bar 36 and centered thereon. In FIG. 2, coupling arms 10 and 12 are shown in phantom lines in their positions of coupling engagement with coupling bar 36. After coupling arms 10 and 12 are in position on coupling bar 36, latch arm 22 is rotated downwardly to the position shown in FIG. 3 to bring its hooked bottom end 22a under coupling bar 36. Thus, coupling arms 10 and 12 of trailer 1 are restrained against vertical displacement by latch arm 22, and are contained against lateral displacement by the inner ends of guide plates 38 and 40. After latch arm 22 is in its position of coupling engagement with coupling bar 36, a retainer element is moved into place to hold latch arm 22 under coupling bar 36. Such a retainer element may take the form of a removable, elongated retainer pin 42 which is inserted through apertures in coupling arms 10 and 12 directly in front of latch arm 22 in the manner shown in FIGS. 2 and 3. Spring loaded detentes 42a on one end extremity of retainer pin 42 serve to hold it in place across coupling arms 10 and 12.

It will be appreciated that drawbar 2 can be quickly and easily coupled to, and disengaged from, coupling bar 36 in the aforesaid manner. Base plate 24 is preferably positioned forwardly of the rear axle of the towing truck 4 as shown in FIG. 1 in order that the weight load of the trailer will be distributed over all four wheels of towing truck 4. The use of a horizontally extending, round bar 36 as a coupling member on the towing vehicle provides several advantages. In addition to permitting the quick and easy coupling of the notched bottom ends of coupling arms 10 and 12 therewith, round coupling bar 36 serves to distribute the weight load of the trailer 1 over a relatively wide area of the bed 6 of towing vehicle 4 through ring member 30. The rotatable mounting of ring member 30 on apertured base plate 24 of course permits the necessary relative turning movement between towing truck 4 and trailer 1. Also, the use of horizontally extending coupling bar 36 on rotary support ring 30 provides a truck mounted coupling assembly of extreme low profile. Thus, the coupling unit mounted on the bed 6 of towing truck 4 does not unduly interfere with the use of the cargo space of truck 4 when it is not being used to tow a trailer.

As noted above, the load coupler disclosed herein may be mounted and utilized on towing vehicles and trailers of various kinds, and is not necessarily limited to use with gooseneck drawbars of the type shown in FIG. 1. I anticipate that various changes may be made in the size, shape and construction of the load coupler disclosed herein without departing from the spirit and scope of my invention as defined by the following claims.

What is claimed is:

1. A trailer hitch for coupling a trailer drawbar to the bed of a towing vehicle comprising:
   an elongated, gooseneck shaped drawbar affixed to the front end of a trailer;
   generally vertically extending coupling arm means attached to the forward end of said drawbar;
   a horizontally positioned ring member rotatably supported on base means affixed to the rear bed of a towing vehicle;
   an elongated, rigid, coupling bar extending horizontally across said ring member and affixed thereto; and
   means on said coupling arm means restrainably and pivotally engaged with said coupling bar in releasable, coupling connection therewith, for relative pivotal movement between said coupling arm means and said bar about the horizontal axis defined by said coupling bar.

2. A trailer hitch as defined in claim 1 wherein:
   said ring member is of upright, circular shape having generally vertically extending side walls, and said coupling bar is affixed at its opposite ends to said side walls of said ring member.

3. A trailer hitch as defined in claim 2 wherein:
   said coupling bar extends diametrically across said ring member.

4. A trailer hitch as defined in claim 1 wherein:
   said means on said coupling arm means restrainably engaging said coupling bar comprises downwardly opening notches on the bottom end of said coupling arm means within which said coupling bar is restrainably received.

5. A trailer hitch as defined in claim 4 wherein:
   said coupling bar is round and said notches are arcuate shaped at their upper ends to conform to the shape of said coupling bar.

6. A trailer hitch as defined in claim 4 wherein:
   said coupling arm means comprises two spaced apart, vertically extending arms having downwardly opening notches on their bottom ends; and
   a latch arm rotatably supported between said coupling arms for swinging movement about a horizontal axis, said latch arm having a hooked bottom end swingable under said coupling bar to secure said arms in coupling engagement therewith.

7. A trailer hitch as defined in claim 2 wherein:

said base means comprises a horizontal base plate having a circular aperture therein within which said ring member is supported; and annular bearing support means on the outside face of said ring member side walls rotatably supported on the inner, circular periphery of said base plate around said circular aperture.

8. A trailer hitch as defined in claim 7 wherein:

said annular bearing support means comprises a pair of circular bars vertically spaced apart on the outside face of said ring member with the inner circular periphery of said base plate around said aperture extending between said pair of circular bars.

9. A trailer hitch as defined in claim 1 wherein:

said coupling arm means comprises two spaced apart, vertically extending arms having downwardly opening notches at their bottom ends within which said coupling bar is received in releasable, coupling engagement therewith, said arms extending downwardly over and around said coupling bar on both sides of said notches; and a pair of guide plates affixed to opposite inside faces of said ring member and extending inwardly therefrom, the inner ends of said guide plates being spaced apart a predetermined distance substantially equal to the spacing between said coupling arms to guide and center said arms therebetween.

10. A trailer hitch as defined in claim 1 wherein:

said towing vehicle is a pickup truck, and said base means is affixed to the cargo carrying bed of said truck forwardly of the truck's rear axle.

11. A disconnectable trailer hitch assembly for coupling a trailer to a towing vehicle comprising:

a hitch member affixed to the front end of a trailer;

generally vertically extending coupling arm means on said hitch member, said arm means having downwardly opening notches on the bottom end thereof;

a round, horizontally extending coupling bar supported on base means affixed to the rear end of a towing vehicle for revolving movement in a horizontal plane, said downwardly opening notches on said coupling arm means fitting snuggly around said coupling bar in releasable, coupling engagement therewith.

12. A trailer hitch as defined in claim 11 wherein:

said coupling arm means is held in coupling engagement with said round coupling bar by shiftable latch means mounted on said coupling arm means for movement into and out of restraining engagement with said coupling bar.

13. A trailer hitch as defined in claim 11 wherein:

said base means comprises a horizontal base plate affixed to the rear bed of a towing truck at an elevated level thereabove, said round coupling bar being affixed at its opposite ends to rotary guide means rotatably supported on said base plate.

14. A trailer hitch as defined in claim 13 wherein:

said base plate has a circular aperture therein, and said rotary guide means comprises an upright ring member positioned within said circular aperture, and annular bearing support means affixed to the outside face of said ring member and rotatably supported on the inner circular periphery of said base plate around said circular aperture, and said coupling bar extending across said ring member and being affixed at its opposite ends thereto.

15. A trailer hitch as defined in claim 14 wherein:

said annular bearing support means comprises at least one circular bar affixed to the outside face of said ring member and rotatably supported on the top of said base plate adjacent to said circular aperture.

16. A trailer hitch as defined in claim 15 wherein:

said coupling arm means comprises a pair of spaced apart, vertically extending arms having downwardly opening notches at their bottom ends within which said coupling bar is received in releasable, coupling engagement therewith, said notches being shaped to conform to the shape of said round, coupling bar, and said arms extending downwardly over and around said coupling bar on both sides thereof; and a pair of guide plates affixed to opposite, inside faces of said ring member and inclining downwardly and inwardly therefrom, the inner ends of said guide plates being spaced apart a predetermined distance coinciding with the spacing between said coupling arms, whereby said inclined guide plates serve to guide said coupling arms laterally to the space therebetween, within which said coupling arms are restrained against lateral movement.

17. A trailer hitch as defined in claim 12 wherein:

said latch means comprises a latch arm rotatably supported on said coupling arm means for swinging movement about a horizontal axis, and having means thereon for engagement with said coupling bar; and a retainer element supported on said coupling arm means and movable into restraining engagement with said latch arm to hold said latch arm in coupling engagement with said coupling bar.

* * * * *